US009514456B2

(12) United States Patent
England et al.

(10) Patent No.: US 9,514,456 B2
(45) Date of Patent: Dec. 6, 2016

(54) SINGLE PAYMENT CARD FOR FLEXIBLE PAYMENT VEHICLE OPTIONS FOR A TRANSACTION

(71) Applicant: BANK OF AMERICA CORPORATION, Charlotte, NC (US)

(72) Inventors: Tony England, Tega Cay, SC (US); Scott Lee Harkey, Concord, NC (US); Matthew A. Calman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 126 days.

(21) Appl. No.: 13/827,665

(22) Filed: Mar. 14, 2013

(65) Prior Publication Data

US 2014/0279471 A1 Sep. 18, 2014

(51) Int. Cl.
G06Q 40/00 (2012.01)
G06Q 20/34 (2012.01)
G06Q 20/40 (2012.01)

(52) U.S. Cl.
CPC ........ *G06Q 20/3572* (2013.01); *G06Q 20/405* (2013.01)

(58) Field of Classification Search
USPC ............................... 705/35, 36 R, 38, 39, 40
See application file for complete search history.

(56) References Cited

U.S. PATENT DOCUMENTS

| 5,644,727 | A | | 7/1997 | Atkins et al. |
| 6,021,397 | A | * | 2/2000 | Jones et al. ................. 705/36 R |
| 7,318,049 | B2 | | 1/2008 | Iannacci |
| 7,587,363 | B2 | | 9/2009 | Cataline et al. |
| 7,630,937 | B1 | | 12/2009 | Mo et al. |
| 7,890,422 | B1 | | 2/2011 | Hirka et al. |
| 8,275,702 | B1 | * | 9/2012 | Enriquez ......................... 705/39 |
| 2001/0042785 | A1 | * | 11/2001 | Walker et al. ................. 235/379 |
| 2004/0117302 | A1 | * | 6/2004 | Weichert et al. ............... 705/40 |
| 2005/0199714 | A1 | * | 9/2005 | Brandt ................. G06Q 20/425 |
| | | | | 235/382.5 |
| 2007/0005498 | A1 | | 1/2007 | Cataline et al. |
| 2007/0162387 | A1 | | 7/2007 | Cataline et al. |

(Continued)

OTHER PUBLICATIONS

U.S. Appl. No. 13/690,117, filed Nov. 30, 2012.

*Primary Examiner* — Lalita M Hamilton
(74) *Attorney, Agent, or Firm* — Michael A. Springs; Moore & Van Allen PLLC; Nicholas C. Russell

(57) ABSTRACT

Embodiments of the invention are directed to a system, method, or computer program product for providing a customer with a single transaction card that is tied to the customer's available payment vehicles. As such, the single transaction card may be utilized by the customer to complete a transaction with a merchant. Subsequently, based on customer rules or customer selection, the invention may direct the transaction to the selected payment vehicle. Rules include any preferences that a customer may input that allows the invention to automatically apply a single transaction card transaction to a payment vehicle. As such, rules may be trigged for a specific merchant, a specific transaction amount, a specific location, and/or the like. If a rule is triggered by a transaction made with the single transaction card, the triggered transaction will be automatically applied to the payment vehicle tied to that rule.

21 Claims, 6 Drawing Sheets

(56) References Cited

U.S. PATENT DOCUMENTS

| | | |
|---|---|---|
| 2009/0119204 A1 | 5/2009 | Akella et al. |
| 2009/0144166 A1 | 6/2009 | Dickelman |
| 2009/0192904 A1* | 7/2009 | Patterson ............... G06Q 20/20 705/17 |
| 2009/0265241 A1 | 10/2009 | Bishop et al. |
| 2010/0082445 A1 | 4/2010 | Hodge et al. |
| 2010/0288834 A1 | 11/2010 | Tichelaer et al. |
| 2010/0299195 A1 | 11/2010 | Nix et al. |
| 2012/0023024 A1* | 1/2012 | Evans .................. G06Q 20/105 705/66 |
| 2012/0150643 A1* | 6/2012 | Wolfe et al. ............... 705/14.53 |
| 2012/0197740 A1* | 8/2012 | Grigg et al. .................... 705/16 |
| 2012/0221420 A1 | 8/2012 | Ross |
| 2013/0334304 A1* | 12/2013 | Yankovich et al. .......... 235/379 |
| 2013/0339165 A1* | 12/2013 | Calman .......................... 705/16 |

\* cited by examiner

SINGLE PAYMENT CARD FOR FLEXIBLE PAYMENT VEHICLE OPTIONS FOR A TRANSACTION

BACKGROUND

Customers typically have a variety of payment options when entering into a transaction with a business, such as but not limited to cash, check, gift cards, credit cards, debit cards, or the like. Payment options, such as a credit or debit card, may be issued through financial institutions, retail stores, gas stations, airlines, and other businesses. Often, the businesses that issue the payment option provide promotions such as reward points, travel miles, cash back bonuses, product or store discounts, free gifts, or the like.

Selecting a payment option for a transaction may be as easy as grabbing the first credit card out of the customer's wallet or selecting a payment option for a transaction may be difficult and include many factors.

Utilizing a proper payment option when making a transaction may provide additional value to the customer, by maximizing the profitability from a transaction.

BRIEF SUMMARY

Embodiments of the present invention address the above needs and/or achieve other advantages by providing apparatuses (e.g., a system, computer program product and/or other devices) and methods for providing a single transaction card that is tied to the customer's available payment vehicles. As such, a single transaction card is provided to a customer. The single transaction card may be utilized by the customer to complete a transaction with a merchant. Subsequently, based on customer rules or customer selection, the invention may direct the transaction to the requested payment vehicle. Rules include any preferences that a customer may input that allow the invention to automatically apply a single transaction card transaction to a payment vehicle. As such, rules may be trigged by a specific merchant, a specific transaction amount, a specific location, and/or the like. If a rule is triggered by a purchase made with the single transaction card, the triggered transaction will be automatically applied to the payment vehicle tied to that rule.

In some embodiments, a transaction using the single transaction card does not trigger a rule. In those instances, the customer may be sent a message to confirm which of the one or more payment vehicles the customer may wish to apply the transaction to. Once a payment vehicle is selected, the invention may apply the transaction from the single transaction card to the selected payment vehicle. In some embodiments, this application of the transaction may be after the transaction has occurred. As such, the invention may provide a temporary line of credit associated with the single transaction card. In this way, the customer may have time after the transaction to apply the transaction to a payment vehicle.

Embodiments of the invention relate to systems, methods, and computer program products for a single transaction card associated with one or more payment vehicles to complete a transaction, the invention comprising: providing a single transaction card to a customer, wherein the single transaction card acts like a payment card and is associated with one or more payment vehicles available to the customer; determining one or more payment vehicles available to the customer and associated the one or more payment vehicles with the single transaction card; providing rules engine for customer rules input, wherein the inputted rules determine a selected payment vehicle for a transaction based on a rules triggering event; receiving indication of a transaction between the customer and a merchant, wherein the single transaction card was utilized in the transaction; receiving transaction details associated with the transaction between the customer and the merchant, wherein transaction details include merchant type, merchant location, merchant name, products of the transaction, and total purchase amount; detecting, based at least in part on the transaction details, if the transaction triggered a rules triggering event; identifying rule associated with the rule triggering event, wherein identifying the rule is based at least in part on detecting the transaction triggered the rules triggering event; identifying the selected payment vehicle associated with the rule associated with the rules triggering event; and applying, automatically, the selected payment vehicle to the total purchase amount of the transaction.

In some embodiments, wherein if no rules triggering event is detected, the invention further comprises: providing the customer with notification of no triggering event; providing the customer with a selection interface for selection of the one or more payment vehicles available to the customer to complete the transaction; providing a temporary line of credit to the merchant to satisfy the total purchase amount of the transaction while the selection interface is pending with the customer; and applying, based on a response from the selection interface, a selected payment vehicle to the temporary line of credit and terminate the temporary line of credit.

In some embodiments, determining the one or more payment vehicles available to the customer further comprises: determining, automatically, the one or more payment vehicles available to the customer based on customer transaction history; or receiving input from the customer, wherein the input comprises the one or more payment vehicles available to the customer, wherein the one or more payment vehicles available to the customer comprise cash, credit card account, a debit card account, a line of credit account, a retail card, a savings account, an investment account, or a line of credit.

In some embodiments, providing rules engine for customer rules input further comprises rules associated with the frequency of the transaction, the merchant of the transaction, the total purchase amount of the transaction, a location of the transaction, or transaction history of the customer.

In some embodiments, the invention further comprises receiving a customer enrollment indication such that the customer authorizes access to the payment vehicles available to the customer and is provided the rules engine.

In some embodiments, providing the temporary line of credit to satisfy the total purchase amount of the transaction further comprises providing the temporary line of credit directly to the merchant to apply to the total purchase amount of the transaction, wherein applying the temporary line of credit to the total purchase amount of the transaction completes the transaction between the customer and merchant.

In some embodiments, applying the selected payment vehicle to the temporary line of credit further comprises closing the temporary line of credit that satisfied the total purchase amount of the transaction, such that the selected payment vehicle has the total purchase amount of the transaction applied thereto.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
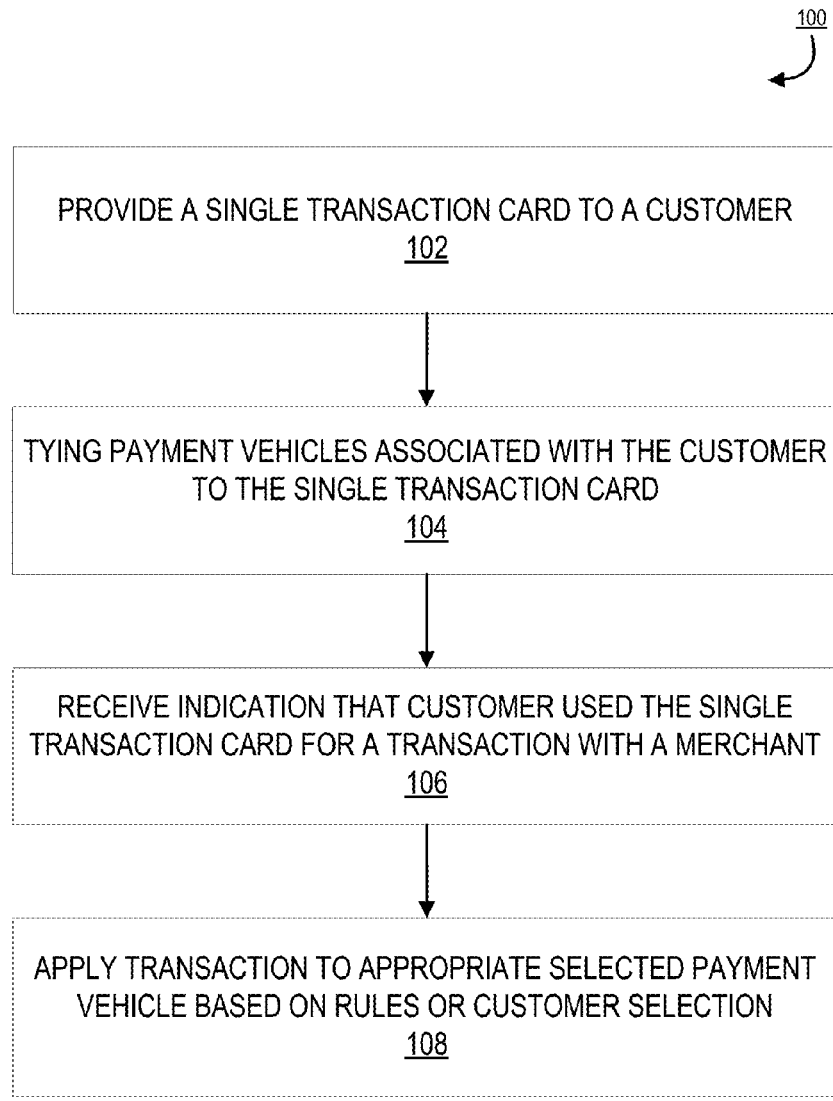
Figure 2:
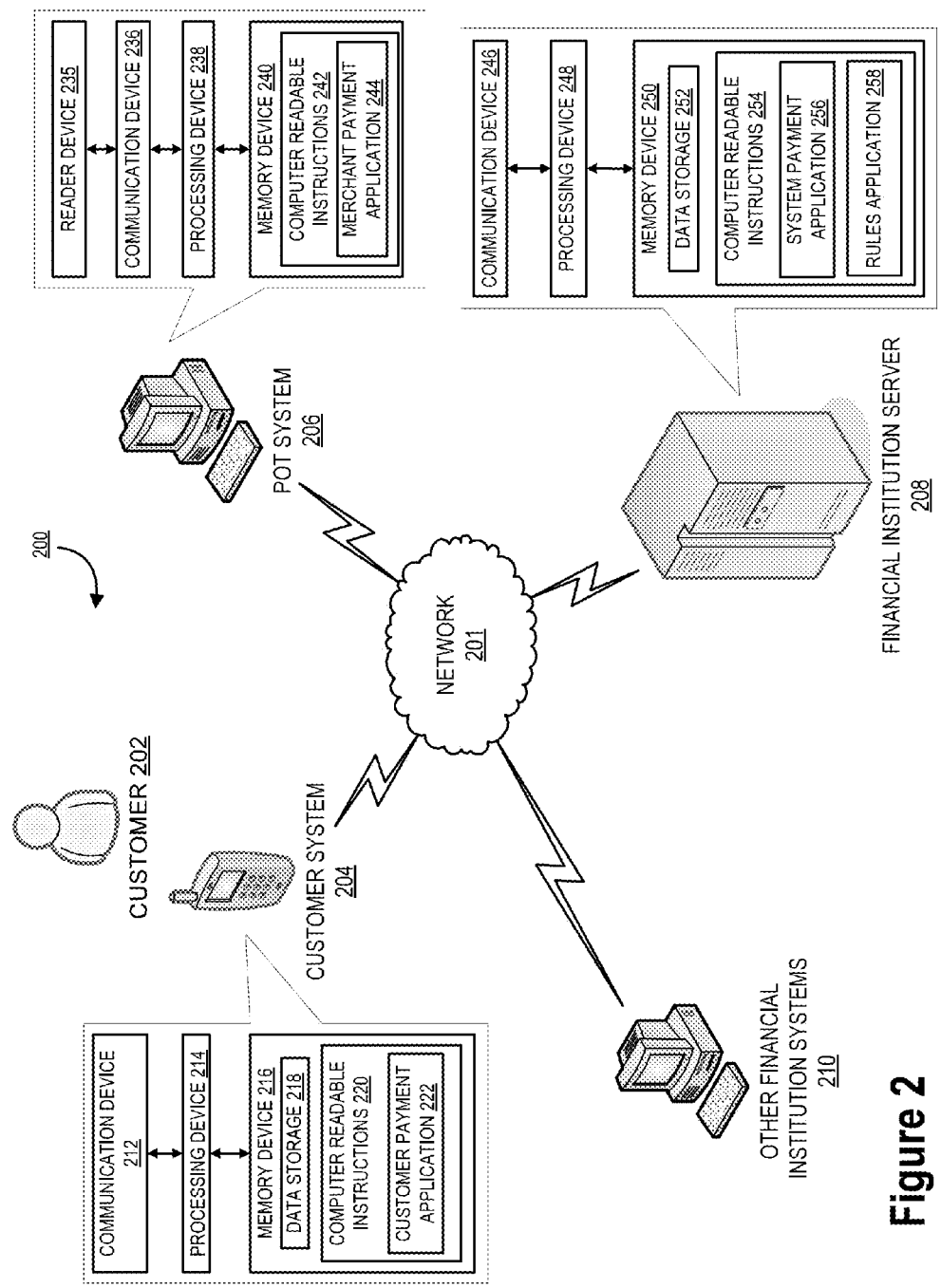
Figure 3:
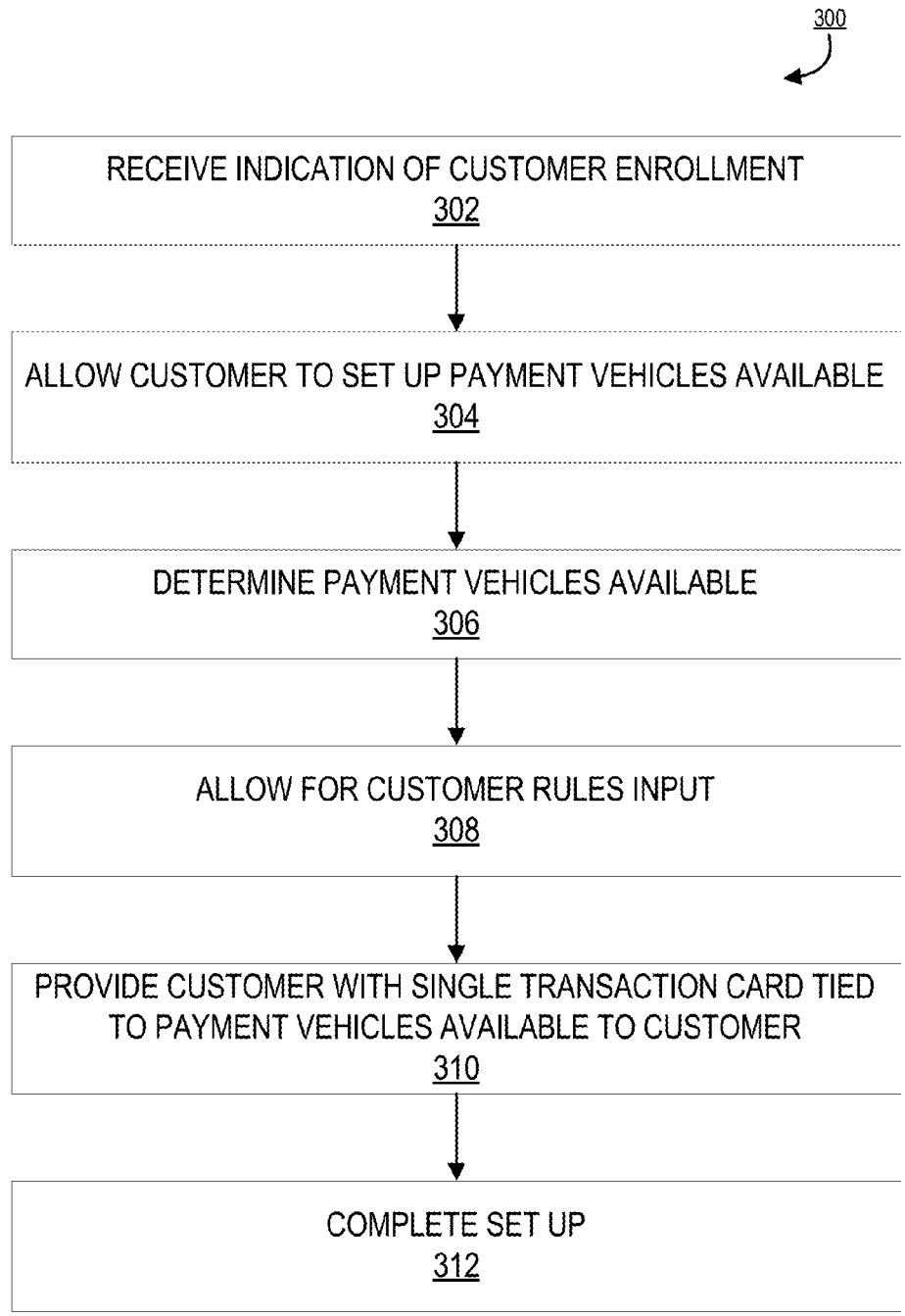
Figure 4:
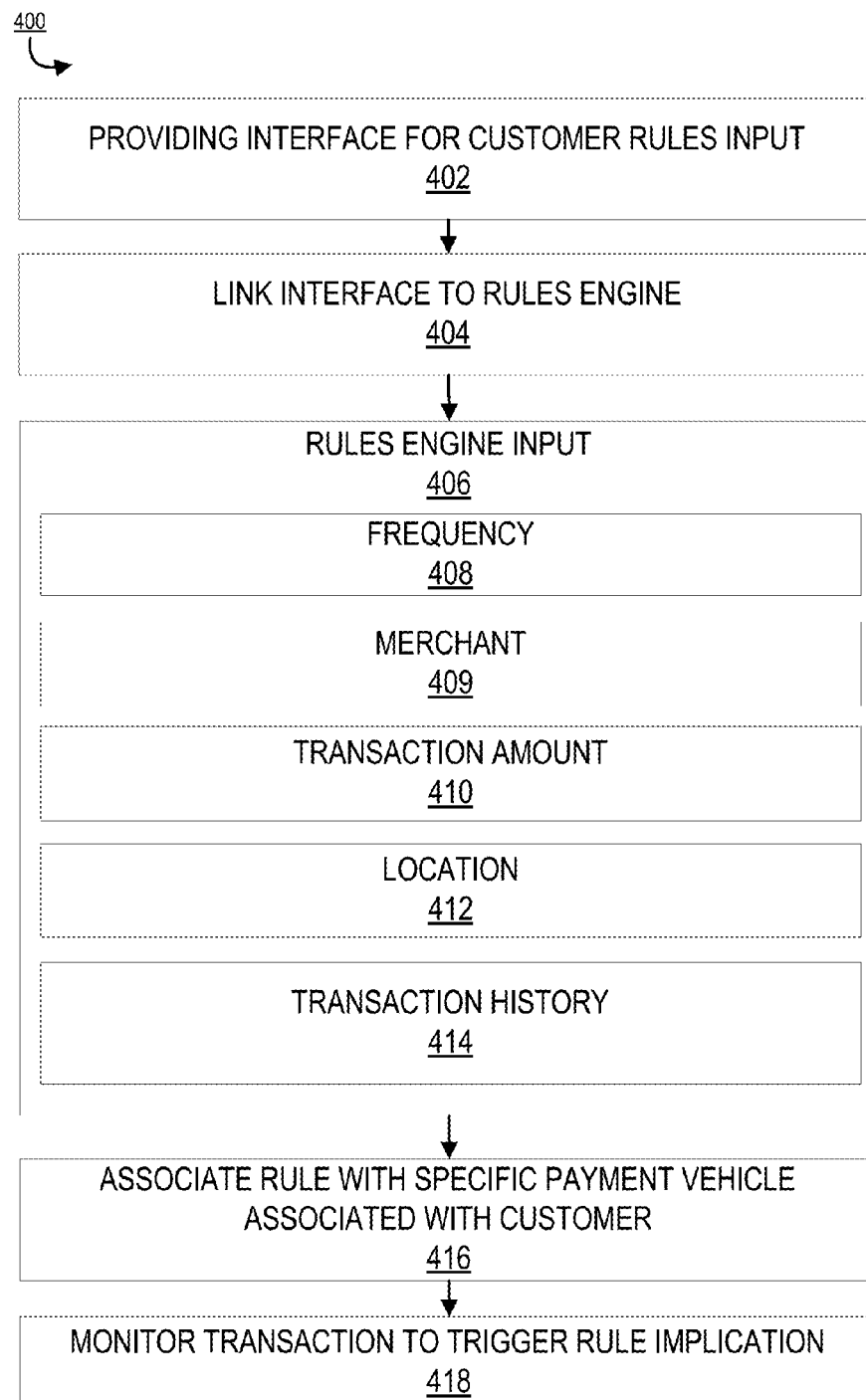
Figure 5:
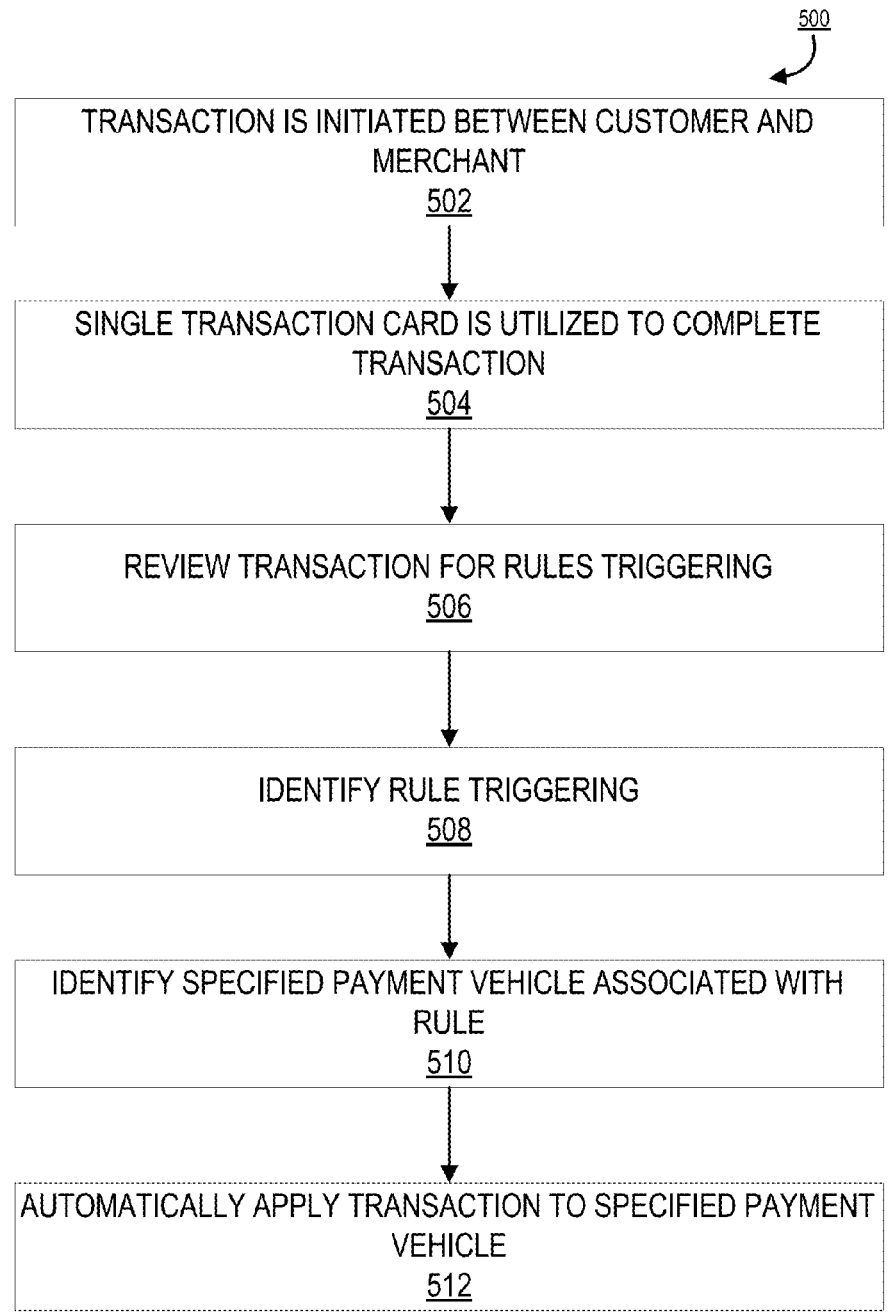
Figure 6:
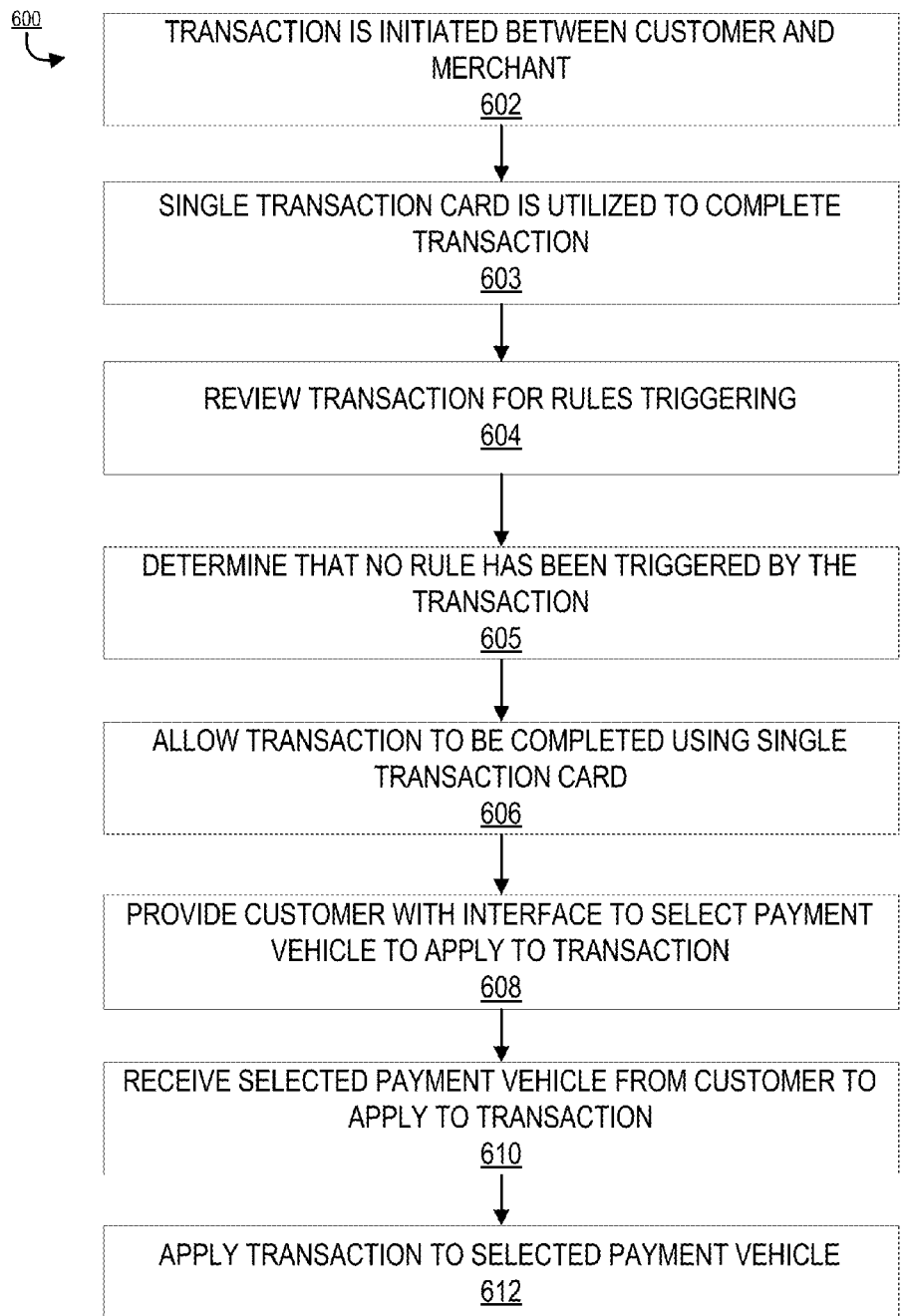

Having thus described embodiments of the invention in general terms, reference will now be made to the accompanying drawings, wherein:

FIG. 1 provides a high level process flow illustrating the single transaction card flexible payment process, in accordance with one embodiment of the present invention;

FIG. 2 provides a single transaction card flexible payment system environment, in accordance with one embodiment of the present invention;

FIG. 3 provides a process map illustrating a single transaction card set up process, in accordance with one embodiment of the present invention;

FIG. 4 provides a process map illustrating a rules set up for the single transaction card flexible payment process, in accordance with one embodiment of the present invention;

FIG. 5 provides a process map illustrating the process of a single transaction card transaction triggering a rule, in accordance with one embodiment of the present invention; and FIG. 6 provides a process map illustrating the process of a single transaction card transaction triggering a notification, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, the term "payment vehicle" or "payment account" as used herein may include any method of payment for purchasing a product or service. Payment vehicles may include, but are not limited to cash, credit cards, debit cards, lines of credit, checks, debit notes, payment accounts, fund accounts, or the like. The term "product" as used herein may include any product, service, or the like that may be purchased or obtained from a merchant.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to customers.

Some portions of this disclosure are written in terms of a financial institution's unique position with respect to customer transactions. As such, a financial institution may be able to utilize its unique position to receive, store, process, and retrieve information associated with transactions.

The embodiments described herein may refer to the use of a transaction, transaction event or point of transaction event to trigger the steps, functions, routines, or the like described herein. In various embodiments, occurrence of a transaction triggers the sending of information such as offers and the like. Unless specifically limited by the context, a "transaction", "transaction event" or "point of transaction event" refers to any communication between the customer and the merchant, e.g. financial institution, or other entity monitoring the customer's activities. In some embodiments, for example, a transaction may refer to a purchase of goods or services, a return of goods or services, a payment transaction, a credit transaction, or other interaction involving a customer's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a customer's computer or mobile device, a customer accessing their e-wallet or any other interaction involving the user and/or the customer's device that is detectable by the financial institution. As further examples, a transaction may occur when an entity associated with the customer is alerted via the transaction of the customer's location. A transaction may occur when a customer accesses a building, uses a rewards card, and/or performs an account balance query. A transaction may occur as a customer's mobile device establishes a wireless connection, such as a Wi-Fi connection, with a point-of-sale (or point-of-transaction) terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a customer's device, such as a customer's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the customer's perspective, the merchant's perspective or both. In some embodiments, the point-of-transaction device refers only to a customer's device, in other embodiments it refers only to a merchant device, and in yet other embodiments, it refers to both a customer device and a merchant device interacting to perform a transaction. For example, in one embodiment, the point-of-transaction device refers to the customer's mobile device configured to communicate with a merchant's point of sale terminal, whereas in other embodiments, the point-of-transaction device refers to the merchant's point of sale terminal configured to communicate with a customer's mobile device, and in yet other embodiments, the point-of-transaction device refers to both the customer's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a customer may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the customer of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

FIG. 1 illustrates a high level process flow for the single transaction card flexible payment process 100, in accordance with one embodiment of the present invention, which will be discussed in further detail throughout this specification with respect to FIG. 2 through FIG. 6. The first step in the process 100, as illustrated in block 102, is to provide a customer with a single transaction card. The single transaction card may be utilized by a customer complete any transaction with a merchant. A customer, as used herein may include, but is not limited to, a user, individual, person, entity, or other individual that may enter into a transaction with a merchant. The type of transaction may be online, offline, type of merchant, at a brick and mortar store location, over the phone, or the like. The transaction may be for a product, service, or the like.

Next, the single transaction card may be tied to the payment vehicles associated with the customer, as illustrated in block 104. Payment vehicles may include, but are not limited to cash, credit cards, debit cards, lines of credit, checks, debit notes, payment accounts, fund accounts, or the like. Next, as illustrated in block 106, the system may receive an indication that a customer used the single transaction card for a transaction with a merchant. In some embodiments, the indication may be provided by the customer. In some embodiments, the indication may be provided by the merchant. In yet other embodiments, the indication may be provided by an issuing entity.

Finally, as illustrated in block 108, in some embodiments, the system may be able to apply the transaction amount to an appropriate selected payment vehicle. The selected payment vehicle may be based on rules or customer selection. In this way, in some embodiments, payment for completion of the transaction may be directed to the selected payment vehicle.

FIG. 2 provides a single transaction card flexible payment system environment 200, in accordance with one embodiment of the present invention. As illustrated in FIG. 2, the financial institution server 208 is operatively coupled, via a network 201 to the customer system 204, to the point-of-transaction (POT) system 206, and to other financial institution systems 210. In this way, the financial institution server 208 can send information to and receive information from the customer system 204, the POT system 206, and other financial institution systems 210, to provide and apply payment vehicles to transactions between customers 202 and merchants based on the single transaction card flexible payment. FIG. 2 illustrates only one example of an embodiment of a single transaction card flexible payment system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the customer 202 is an individual making a financial transaction. The financial transaction may be made at a POT system 206 of a merchant, online or offline, over the phone, at the merchant's place of business and/or other transaction means. The purchase may be made by the customer 202 using a customer system 204, such as a mobile wallet (i.e. smart phone, PDA, and the like) or other types of payment systems that communicate with POS systems 206 and/or financial institution servers 208 to allow the customer 202 to provide rules input, provide the single transaction card to complete the transaction, and receive/select notifications associated with payment vehicle selection. In some embodiments of the invention, the customer 202 may enter into transactions using a single transaction card with stored magnetic information, digital information, or other like payment device that stores information that may be transferred to a POT system 206 and/or a financial institution server 208 to allow a customer 202 to enter into a transaction. In some embodiments, the customer 202 may be a merchant or a person, employee, agent, independent contractor, and the like acting on behalf of the merchant to enter into a transaction.

As illustrated in FIG. 2, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POT system 206, the customer system 204, and the other financial institution computer systems 210. As such, the communication device 246 generally comprises a modem, server, or other device for communicating with other devices on the network 201.

As further illustrated in FIG. 2, the financial institution server 208 comprises computer-readable instructions 254 stored in the memory device 250, which in one embodiment includes the computer-readable instructions 254 of a rule application 258. In some embodiments, the computer-readable instructions 254 include a system payment application 256. In some embodiments, the memory device 250 includes data storage 252 for storing data related to the single transaction card flexible payment system including but not limited to data created and/or used by the rules application 258 and/or the system payment application 256.

In the embodiment illustrated in FIG. 2 and described throughout much of this specification, the system payment application 256 allows for customer 202 transactions using a single transaction card that may be tied to the customer's available payment vehicles. As such, the system payment application 256 allows for application of a transaction to a payment vehicle associated with the customer 202 based on customer rules or notifications.

First, the system payment application 256 may identify a customer 202 enrollment into the process. Once enrolled the system payment application 256 may link a single transaction card to the customer 202 and his/her available payment vehicles. In some embodiments available payment vehicles are received as inputs from the customer 202 using the customer system 204 communication via the network 201. In some embodiments, the system payment application 256 may determine the available payment vehicles associated with the customer 202. In yet other embodiments, the system payment application 256 receives the available payment vehicles associated with a customer 202 from other entities such as those associated with the other financial institution systems 210 or the like. The system payment application 256 may then store the customer's available payment vehicles in the memory device 250. The stored available payment vehicles may include all information associated with the payment vehicle that is necessary to complete a transaction using the payment vehicle. In this way, the information may include an account number, routing number, expiration date, name associated with the vehicle, security code, and/or the like.

Once enrolled, the customer 202 may, if he/she desires, input rules as described in more detail below with respect to FIG. 4. Next, the system payment application 256 may review the inputs and communicate with the rules application 258. In some embodiments, the system payment application 256 may receive customer 202 rules via communication with the customer system 204 via the network 201. In this way, the system payment application 256 may be able to take this inputted data and generate a rules engine to apply to all future customer 202 transactions using the single transaction card. This rules engine may be stored and implemented in the rules application 258.

Once the single transaction card is provided and the payment vehicles associated with the customer 202 are determined, the system payment application 256 may tie the payment vehicles associated with the customer and the inputted rules to the single transaction card. As such, whenever a transaction occurs using the single transaction card, the system payment application 256 may review the rules and/or notifications and provide a specified payment vehicle.

In some embodiments, the system payment application 256 may identify when the customer 202 utilizes the single transaction card for the transaction. In some embodiments, the transaction may be communicated to the system payment application 256 from the POT system 206 associated with the merchant of the transaction. In other embodiments, the customer system 204 may communicate the transaction to the system payment application 256. In yet other embodiments, the system payment application 256 may receive an indication of a transaction from the single transaction card itself.

The system payment application 256 may also determine the merchant of the transaction. As such, the system payment application 256 may determine the classification of the merchant, such as a department store, grocery store, gas station, or the like. Furthermore, the system payment application 256 may determine the store name, such as Gas Station 1 or Department Store 2.

Once the transaction has been initiated the system payment application 256 may, in association with the rules application 258 monitor the rules to see if the transaction triggers a rule event.

If a rules event is triggered, the system payment application 256 may retrieve the payment vehicle associated with that rule. Retrieving the payment vehicle may include retrieving the account number, routing number, name, expiration, security code, or the like such that the system payment application 256 may utilize the payment vehicle to pay for the transaction. Once the system payment application 256 retrieves the payment vehicle associated with that rule, the system payment application 256 may automatically apply the payment vehicle to the transaction. In some embodiments, the system payment application 256 may communicate the application of the specified payment vehicle associated with that rule directly to the POT system 206 to complete the customer's transaction with the merchant associated with that POT system 206. In other embodiments, the system payment application 256 may communicate the specified payment vehicle associated with that rule to the issuing entity to apply to the transaction. In yet other embodiments, the system payment application 256 may communicate the specified payment vehicle associated with that rule to the customer 202 via the customer system 204.

In some embodiments, the system payment application 256 in association with the rules application 258 may not identify a rules triggering event associated with the transaction. If no rules triggering event occurs the system payment application 256 may provide the customer 202 with an interface via his/her customer system 204. The interface allows the customer 202 to select one or more of the customer's available payment vehicles to utilize to complete the transaction. In some embodiments, this selection happens at the POT during a transaction such that the system payment application 256 may communicate with the POT system 206 the selected payment vehicle to apply to the transaction amount. In some embodiments, the interface may be presented to the customer 202 sometime after the transaction has been completed. In this way, the system payment application 256 may provide the POT system 206 with a temporary line of credit to apply the transaction to. In this way, the customer 202 may retroactively select the payment vehicle he/she wished to utilize for that transaction. Once selected, the customer 202 may provide an indication of the selection to the system payment application 256. The system payment application 256 may then apply the selected payment vehicle to the transaction (or temporary line of credit) to satisfy the temporary line of credit. Subsequently, the system payment application 256 may terminate the temporary line of credit.

As illustrated in FIG. 2, the financial institution server 208 further comprises a rules application 258. The rules application 258 receives and stores customer 202 inputted rules in the form of a rules engine. The rules are discussed in further detail below with respect to FIG. 4. Furthermore the rules application 258 may indicate to the system payment application 256 when/if a rule is triggered from a customer 202 transaction with a merchant using the single transaction card.

In some embodiments, the rules application 258 also stores payment vehicles and information associated therewith to aid the system payment application 256 in applying the selected payment vehicle to the transaction that utilized the single transaction card. This information may including, but not limited to payment vehicles available to a customer 202 and information associated with the available payment vehicles, such that the system payment application 256 may utilize the available payment vehicles to complete transactions using the single transaction card. As such, this information may include account numbers, routing numbers, security numbers, expiration dates, names, signatures, and/or other information associated with the payment vehicle that may be required to complete a transaction.

In this way, the rules application 258 is connected to the system payment application 256, such that the system payment application 256 has access to the stored rules engine, payment vehicles, and information associated therewith. This information is retrieved and stored via the rules application 258. In this way, the rules application 258 may have information associated with customer 201 inputted rules and/or each of the one or more payment vehicles a customer 202 may have. Furthermore, the rules application 258 may also receive and store information associated with how the customer 202 utilizes the payment vehicle or trends associated with the payment vehicle, such as the transaction history of the customer 202 with respect to the available payment vehicles. For example, if the customer 202 always uses Credit Card 1 to purchase gas, the rules application 258 may recognize this trend and associate that trend with Credit Card 1. Furthermore, the rules application 258 may have issuing entity information associated with each payment vehicle. This issuing entity information may comprise one or more rewards, functions, features, or the like associated with the payment vehicles. For example, Credit Card 2 may have a percent cash back for a specific type of purchase or purchase location.

As illustrated in FIG. 2, the POT system 206 generally comprises a reading device 235, a communication device 236, a processing device 238, and a memory device 240. The reading device 235 is operatively coupled to the processing device 238, communication device 236, and the memory device 240. The POT system 206 may include a reader device 235 to receive payment vehicle information from the customer 202 through the customer system 204 and/or other payment devices. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the consumer's payment vehicle, such as the single transaction card, and/or transaction data at the POT system 206 and communicates the information via the communication device 236 over a network 201, to other systems such as, but not limited to the financial institution server 208, other financial institution systems 210, and/or the customer system 204. As such, the communication device 236 generally comprises a modem, server, or other device for communicating with other devices on the network 201.

As further illustrated in FIG. 2, the POT system 206 comprises computer-readable instructions 242 stored in the memory device 240, which in one embodiment includes the computer-readable instructions 242 of a merchant payment application 244.

In the embodiment illustrated in FIG. 2, the merchant payment application 244 allows the POT system 206 to be linked to the financial institution server 208 and other financial institution systems 210 to communicate, via a network 201, the information related to the transaction being made using a single transaction card, such as the transaction type, cost, product type, merchant location, and the like. In one example, the customer 202 enters into a transaction at a POT system 206 utilizing the single transaction card, which processes the transaction and the merchant payment application 244 allows communication of the transaction information to the financial institution server 208. Furthermore, the financial institution server 208 or other financial institution systems 210 may communicate with the merchant payment application 244 to provide the POT system 206 with the selected payment vehicle to apply to the transaction for the customer 202.

FIG. 2 also illustrates a customer system 204. The customer system 204 generally comprises a communication device 212, a processing device 214, and a memory device 216. The customer system 204 is a computing system that may allow a customer 202 to enter into transactions, via a network 201, with the POT system 206 using the single transaction card, supply the system payment application 256 with payment vehicle information, inputted rules for transactions, and/or notification responses selecting a payment vehicle for a transaction. The processing device 214 is operatively coupled to the communication device 212 and the memory device 216. The processing device 214 uses the communication device 212 to communicate with the network 201 and other devices on the network 201, such as, but not limited to the POT system 206, the financial institution server 208, and the other financial institution computer systems 210. As such, the communication device 212 generally comprises a modem, server, or other device for communicating with other devices on the network 201.

As further illustrated in FIG. 2, the customer system 204 comprises computer-readable instructions 220 and data storage 218 stored in the memory device 216, which in one embodiment includes the computer-readable instructions 220 of a customer payment application 222. In this way, a customer 202 may be able to enter into transactions at the POT system 206 using the single transaction card, provide rules inputs for transactions, provided notification responses for selecting a payment vehicle for a transaction, and/or confirm selected payment vehicles through the financial institution server 208, using the customer payment application 222. The customer system 204 may be, for example, a desktop personal computer, a mobile system, such as a cellular phone, smart phone, personal data assistant (PDA), laptop, or the like. Although only a single customer system 204 is depicted in FIG. 2, the payment account determination system environment 200 may contain numerous customer systems 204.

The other financial institution systems 210 are operatively coupled to the financial institution server 208, the POT system 206, and/or the customer system 204 through the network 201. The other financial institution systems 210 have systems with devices the same or similar to the devices described for the financial institution server 208, the POT system 206, and/or the customer system 204 (i.e., communication device, processing device, and memory device). Therefore, the other financial institution systems 210 communicate with the financial institution server 208, the POT system 206, and/or the customer system 204 in the same or similar way as previously described with respect to each system. The other financial institution computer systems 210, in some embodiments, are comprised of systems and devices that allow the customer 202 and the financial institution server 208 to access payment vehicle information at the financial institution and/or allow transactions using the customer 202 payment vehicles at the other financial institutions.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a process map for the single transaction card set up process 300, in accordance with one embodiment of the present invention. First, as illustrated in block 302 the process 300 may be initiated when a customer 202 enrolls in the process 300. The customer 202 may be able to enroll in the program by selecting a link provided by the financial institution to download an application on the customer system or to enroll through an online banking application provided by the financial institution or through the other financial institution systems 210.

Next, as illustrated in block 304 the customer 202 may input the payment vehicles he/she has available, irrespective of the issuing entity. Next, at block 306, the system may follow up from customer payment vehicle input and combine any system determined payment vehicles, such as payment vehicles from the process 300 providing entity or the like. Nest as illustrated in block 308, the process 300 allows for customer rules input. Customer rules are described in more detail below with respect to FIG. 4, but customer rules include any preferences that a customer may input that allow the invention to automatically apply a single transaction card transaction to a payment vehicle.

Next, as illustrated in block 310, the customer 202 is provided with a personalize single transaction card that is tied to the customer's available payment vehicles, as determined in block 304 and block 306. Finally, as illustrated in block 312, the set up for proactive recommendation of payment vehicle process 300 is completed.

FIG. 4 illustrates a process map for rules set up for the single transaction card flexible payment process 400, in accordance with one embodiment of the present invention. As illustrated in block 402, the rules set up is initiated by providing an interface to the customer 202 for rules input. In this way, the customer 202 may customize the rules that he/she may wish to implement for utilizing his/her single transaction card. Next, the interface presented to the customer in block 402 may be linked to the rules engine, as illustrated in block 404.

The rules engine input 406 may allow a customer 202 to input rules based on several factors associated with a transaction. In this way, once a rule is triggered, the system may automatically apply the transaction to a specified payment vehicle the customer 202 has selected for that rule. These factors include the frequency 408 of the transaction, the merchant 409 of the transaction, the transaction amount 410, the location 412 of the transaction, and/or the customer's transaction history 414.

The frequency 408 of the transaction rule may allow a customer 202 to select a specific payment vehicle based on the amount of times the customer 202 conducts the same or similar transaction. For example, the customer 202 may provide a rule indicating that if over ten transaction occurred with the same or similar merchant, then the transaction should be applied to Credit Card 1, an available payment vehicle. As such, if the customer 202 transacts with Merchant 1 ten times in a day/week/month/year, those transactions may trigger the rule to apply the transactions to Credit Card 1.

The merchant 409 rule may allow a customer 202 to select a specific payment vehicle based on the merchant of the transaction. In this way, every time a customer 202 transacts with that merchant the rule is triggered and that transaction is automatically applied to a specified payment vehicle. For example, if the customer 202 inputs a rule that every time he/she transacts with Merchant 2 the transaction should be applied to Debit Card 1. As such, the next time the customer transacts with Merchant 2 the total transaction amount is applied to Debit Card 1.

The transaction amount 410 rule allows a customer 202 to input a specific amount of a transaction (either over that amount or under that amount) that will trigger the transaction to be applied to a specified payment vehicle. As such, the customer 202 may set a maximum transaction amount or a minimum transaction amount and anything over or under that amount will be applied to the specified payment vehicle. For example, the customer 202 may input a rule indicated that every transaction under twenty dollars should be applied to Credit Card 2. When the customer 202 transacts with any merchant and the transaction total is under twenty dollars, the rule is triggered and the transaction is applied to Credit Card 2.

The location 412 rule allows a customer 202 to input a location of a transaction that will trigger the transaction to be applied to a specified payment vehicle. In this way, the customer 202 may select a shopping center, specific merchant location, specified mile radius, zip code, state, or the like. As such, the customer 202 may select a location associated with the transaction to trigger the rule. For example, a customer 202 may input a rule indicating that every transaction within a ten mile radius of his/her home should be applied to Credit Card 3. As such, when the customer 202 transacts within a ten mile radius of his/her home the rule is triggered and the system automatically applies the transaction to Credit Card 3.

The transaction history 414 rule allows a customer 202 to review his/her transaction history and select transactions such that the same or similar transaction in the future may be applied to the same payment vehicle as the historic transaction. As such, when the customer 202 enters into a similar transaction as his/her transaction history the rule may be triggered such that the transaction may be applied to a specified payment vehicle. For example, the customer 202 may enter into a transaction once a week at Coffee Shop 1. The customer 202 may input a rule that he/she wishes that all future similar or same transactions be applied to Credit Card 1. As such, the next time the customer 202 uses his/her single transaction card at Coffee Shop 1, the rule may be triggered and the transaction may automatically be applied to Credit Card 1.

Next, as illustrated in block 416 of FIG. 4, once the rules have been inputted by the customer 202, the system may associate the inputted rules with specific payment vehicles that the customer 202 selected. Next, the system may monitor future transactions with the single payment card to determine if the trigger rules, as illustrated in block 418.

FIG. 5 illustrates a process map for the process of a single transaction card transaction triggering a rule 500, in accordance with one embodiment of the present invention. As illustrated in block 502, the process 500 is initiated when a transaction is initiated between a customer 202 and a merchant. Next, the customer 202 utilizes the single transaction card to complete the transaction, as illustrated in block 504.

Once the single transaction card has been utilized, the system may review the transaction to determine if the transaction triggered a rule previously inputted by the customer 202, as illustrated in block 506. Rule triggering is described in more detail above with respect to FIG. 4.

Next, if a rule has been triggered, the system may identify the rule that was triggered, as illustrated in block 508. Next, once the rule has been triggered for the transaction and the rule has been identified, the system may identify the specified payment vehicle associated with the rule, as illustrated in block 510. In this way, when the customer 202 inputs a rule, he/she decides a specified payment vehicle for when the rule gets triggered, the transaction is applied to that specified payment vehicle. At block 510, the system determines which payment vehicle the customer 202 had selected to be applied to the transaction if the rule is triggered.

Finally, as illustrated in block 512, the system may automatically apply the transaction to the specified payment vehicle. In this way, the transaction that was completed using the single transaction card may be applied the specified payment vehicle established by the customer 202 if the transaction triggered the rule.

FIG. 6 illustrates a process map for the process of a single transaction card transaction triggering a notification 600, in accordance with one embodiment of the present invention. The process 600, is initiated with a transaction is initiated between a customer 202 and a merchant, as illustrated in block 602. Next, it is determined that a single transaction card is utilized by the customer 202 to complete the transaction, as illustrated in block 603.

The process 600, then continues to review the transaction for rules triggering, as illustrated in block 604. It may then be determined that no rule has been triggered by the transaction, as illustrated in block 605.

If no rule has been triggered, the system may allow the transaction to be completed using the single transaction card 606. In some embodiments, there may be a temporary line of credit issued to satisfy the transaction. In some embodiments, there may be no need for a temporary line of credit. Once the transaction has been completed, the system may provide the customer 202 with an interface to select a payment vehicle to apply to the transaction, as illustrated in block 608.

Next, as illustrated in block 610 of FIG. 6, the system may receive the selected payment vehicle from the customer 202. The selected payment vehicle may be the payment vehicle that the customer 202 wishes to have applied to the transaction amount associated with the transaction with the merchant. Finally, as illustrated in block 612, the transaction may be applied to the selected payment vehicle.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a single transaction card associated with multiple payment vehicles to complete a transaction, the system comprising:
   a memory device with computer-readable program code stored thereon;
   a communication device;
   a processing device operatively coupled to the memory device and the communication device, wherein the processing device is configured to execute the computer-readable program code to:
   generate, via the processing device, a single transaction card, wherein the single transaction card acts like a payment card and is associated with multiple payment vehicles available to a customer;
   determine the multiple payment vehicles available to the customer via communication via the communication device with issuing financial institution systems for each of the determined multiple payment vehicles;
   associate the determined multiple payment vehicles with the single transaction card based on contacting the issuing financial institution for each of the determined multiple payment vehicles and storing account information received from the issuing financial institution for each of the multiple payment vehicles on the memory device, wherein the account information is stored separately from the single transaction card;
   provide the single transaction card to the customer;
   provide a rules engine to a customer system via the communication device for customer rules input, wherein the inputted rules determine a selected payment vehicle for a transaction based on a rules triggering event;
   receive indication of a transaction between the customer and a merchant, wherein the indication is received at the communication device from a point-of-transaction system associated with a merchant, wherein the single transaction card was utilized in the transaction with the merchant;
   receive transaction details associated with the transaction between the customer and the merchant from the point-of-transaction system based on a request provided by the communication device, wherein transaction details include merchant type, merchant location, merchant name, products of the transaction, and total purchase amount;
   apply, instantaneously, the total purchase amount to a temporary line of credit to complete the transaction and present the temporary line of credit to the point-of-transaction system, wherein the temporary line of credit is provided to the merchant directly, whereby eliminating a customer interaction requirement with the merchant;
   detect, based at least in part on the transaction details, the triggering of rules based on the transaction details associated with the transaction;
   identify, the selected payment vehicle associated with the rule associated with the rules triggering; and
   apply, automatically based on the input received from the customer and the triggered rules, the selected payment vehicle from the determined multiple payment vehicles of the user retroactively to terminate the temporary line of credit and the total purchase amount of the transaction that was completed using the single transaction card.

2. The system of claim 1, wherein if no rules triggering event is detected, the processing device further comprises computer-readable program code to:
   provide the customer with notification of no triggering event;
   provide the customer with a selection interface for selection of the multiple payment vehicles available to the customer to complete the transaction;
   provide a temporary line of credit to the merchant to satisfy the total purchase amount of the transaction while the selection interface is pending with the customer; and
   apply, based on a response from the selection interface, a selected payment vehicle to the temporary line of credit and terminate the temporary line of credit.

3. The system of claim 2, wherein providing the temporary line of credit to satisfy the total purchase amount of the transaction further comprises providing the temporary line of credit directly to the merchant to apply to the total purchase amount of the transaction, wherein applying the temporary line of credit to the total purchase amount of the transaction completes the transaction between the customer and merchant.

4. The system of claim 2, wherein applying the selected payment vehicle to the temporary line of credit further comprises closing the temporary line of credit that satisfied the total purchase amount of the transaction, such that the selected payment vehicle has the total purchase amount of the transaction applied thereto.

5. The system of claim 1, wherein determining the multiple payment vehicles available to the customer further comprises:
- determining, automatically, the multiple payment vehicles available to the customer based on customer transaction history; or
- receiving input from the customer, wherein the input comprises the multiple payment vehicles available to the customer,
- wherein the multiple payment vehicles available to the customer comprise cash, credit card account, a debit card account, a line of credit account, a retail card, a savings account, an investment account, or a line of credit.

6. The system of claim 1, wherein providing rules engine for customer rules input, further comprises rules associated with the frequency of the transaction, the merchant of the transaction, the total purchase amount of the transaction, a location of the transaction, or transaction history of the customer.

7. The system of claim 1 further comprising receiving a customer enrollment indication such that the customer authorizes access to the payment vehicles available to the customer and is provided the rules engine.

8. A computer program product for a single transaction card associated with one or more payment vehicles to complete a transaction, the computer program product comprising at least one non-transitory computer-readable medium having computer-readable program code portions embodied therein, the computer-readable program code portions comprising:
- an executable portion configured for generating, a single transaction card, wherein the single transaction card acts like a payment card and is associated with multiple payment vehicles available to the customer;
- an executable portion configured for determining the multiple payment vehicles available to the customer via communication with issuing financial institution systems for each of the determined multiple payment vehicles;
- an executable portion configured for associating the determined multiple payment vehicles with the single transaction card based on contacting the issuing financial institution for each of the determined multiple payment vehicles and storing account information received from the issuing financial institution for each of the multiple payment vehicles, wherein the account information is stored separately from the single transaction card;
- an executable portion configured for providing the single transaction card to the customer;
- an executable portion configured for providing a rules engine to a customer system for customer rules input, wherein the inputted rules determine a selected payment vehicle for a transaction based on a rules triggering event;
- an executable portion configured for receiving indication of a transaction between the customer and a merchant, wherein the indication is received from a point-of-transaction system associated with a merchant, wherein the single transaction card was utilized in the transaction with the merchant, wherein the single transaction card was utilized in the transaction;
- an executable portion configured for receiving transaction details associated with the transaction between the customer and the merchant from the point-of-transaction system based on a request provided, wherein transaction details include merchant type, merchant location, merchant name, products of the transaction, and total purchase amount;
- an executable portion configured for applying, instantaneously, the total purchase amount to a temporary line of credit to complete the transaction and present the temporary line of credit to the point-of-transaction system, wherein the temporary line of credit is provided to the merchant directly, whereby eliminating a customer interaction requirement with the merchant;
- an executable portion configured for detecting, based at least in part on the transaction details, the triggering of rules based on the transaction details associated with the transaction;
- an executable portion configured for identifying, the selected payment vehicle associated with the rule associated with the rules triggering; and
- an executable portion configured for applying, automatically based on the input received from the customer and the triggered rules, the selected payment vehicle from the determined multiple payment vehicles of the user retroactively to terminate the temporary line of credit and the total purchase amount of the transaction that was completed using the single transaction card.

9. The computer program product of claim 8, wherein if no rules triggering event is detected, further comprising computer-readable program code portions comprising:
- an executable portion configured for providing the customer with notification of no triggering event;
- an executable portion configured for providing the customer with a selection interface for selection of the multiple payment vehicles available to the customer to complete the transaction;
- an executable portion configured for providing a temporary line of credit to the merchant to satisfy the total purchase amount of the transaction while the selection interface is pending with the customer; and
- an executable portion configured for applying, based on a response from the selection interface, a selected payment vehicle to the temporary line of credit and terminate the temporary line of credit.

10. The computer program product of claim 9, wherein providing the temporary line of credit to satisfy the total purchase amount of the transaction further comprises providing the temporary line of credit directly to the merchant to apply to the total purchase amount of the transaction, wherein applying the temporary line of credit to the total purchase amount of the transaction completes the transaction between the customer and merchant.

11. The computer program product of claim 9, wherein applying the selected payment vehicle to the temporary line of credit further comprises closing the temporary line of credit that satisfied the total purchase amount of the transaction, such that the selected payment vehicle has the total purchase amount of the transaction applied thereto.

12. The computer program product of claim 8, wherein determining the multiple payment vehicles available to the customer further comprises:
   determining, automatically, the multiple payment vehicles available to the customer based on customer transaction history; or
   receiving input from the customer, wherein the input comprises the multiple payment vehicles available to the customer,
   wherein the multiple payment vehicles available to the customer comprise cash, credit card account, a debit card account, a line of credit account, a retail card, a savings account, an investment account, or a line of credit.

13. The computer program product of claim 8, wherein providing rules engine for customer rules input, further comprises rules associated with the frequency of the transaction, the merchant of the transaction, the total purchase amount of the transaction, a location of the transaction, or transaction history of the customer.

14. The computer program product of claim 8 further comprising an executable portion configured for receiving a customer enrollment indication such that the customer authorizes access to the payment vehicles available to the customer and is provided the rules engine.

15. A computer-implemented method for a single transaction card associated with one or more payment vehicles to complete a transaction, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   generating, via the processing device, a single transaction card, wherein the single transaction card acts like a payment card and is associated with multiple payment vehicles available to a customer;
   determining the multiple payment vehicles available to the customer via communication with issuing financial institution systems for each of the determined multiple payment vehicles;
   associating the determined multiple payment vehicles with the single transaction card based on contacting the issuing financial institution for each of the determined multiple payment vehicles and storing account information received from the issuing financial institution for each of the multiple payment vehicles, wherein the account information is stored separately from the single transaction card;
   providing the single transaction card to the customer;
   providing a rules engine to a customer system via the communication device for customer rules input, wherein the inputted rules determine a selected payment vehicle for a transaction based on a rules triggering event;
   receiving indication of a transaction between the customer and a merchant wherein the indication is received from a point-of-transaction system associated with a merchant, wherein the single transaction card was utilized in the transaction with the merchant;
   receiving transaction details associated with the transaction between the customer and the merchant from the point-of-transaction system based on a request, wherein transaction details include merchant type, merchant location, merchant name, products of the transaction, and total purchase amount;
   applying, instantaneously, the total purchase amount to a temporary line of credit to complete the transaction and present the temporary line of credit to the point-of-transaction system, wherein the temporary line of credit is provided to the merchant directly, whereby eliminating a customer interaction requirement with the merchant;
   detecting, based at least in part on the transaction details, the triggering of rules based on the transaction details associated with the transaction;
   identifying, the selected payment vehicle associated with the rule associated with the rules triggering; and
   applying, automatically based on the input received from the customer and the triggered rules, the selected payment vehicle from the determined multiple payment vehicles of the user retroactively to terminate the temporary line of credit and the total purchase amount of the transaction that was completed using the single transaction card.

16. The computer-implemented method of claim 15, wherein if no rules triggering event is detected, the method further comprising:
   providing the customer with notification of no triggering event;
   providing the customer with a selection interface for selection of the multiple payment vehicles available to the customer to complete the transaction;
   providing a temporary line of credit to the merchant to satisfy the total purchase amount of the transaction while the selection interface is pending with the customer; and
   applying, via a computer processing device, based on a response from the selection interface, a selected payment vehicle to the temporary line of credit and terminate the temporary line of credit.

17. The computer-implemented method of claim 16, wherein providing the temporary line of credit to satisfy the total purchase amount of the transaction further comprises providing the temporary line of credit directly to the merchant to apply to the total purchase amount of the transaction, wherein applying the temporary line of credit to the total purchase amount of the transaction completes the transaction between the customer and merchant.

18. The computer-implemented method of claim 16, wherein applying the selected payment vehicle to the temporary line of credit further comprises closing the temporary line of credit that satisfied the total purchase amount of the transaction, such that the selected payment vehicle has the total purchase amount of the transaction applied thereto.

19. The computer-implemented method of claim 15, wherein determining the multiple payment vehicles available to the customer further comprises:
   determining, automatically, the multiple payment vehicles available to the customer based on customer transaction history; or
   receiving input from the customer, wherein the input comprises the multiple payment vehicles available to the customer,
   wherein the multiple payment vehicles available to the customer comprise cash, credit card account, a debit card account, a line of credit account, a retail card, a savings account, an investment account, or a line of credit.

20. The computer-implemented method of claim 15, wherein providing rules engine for customer rules input, further comprises rules associated with the frequency of the transaction, the merchant of the transaction, the total purchase amount of the transaction, a location of the transaction, or transaction history of the customer.

21. The computer-implemented method of claim 15 further comprising receiving a customer enrollment indication such that the customer authorizes access to the payment vehicles available to the customer and is provided the rules engine.

* * * * *